United States Patent Office 3,598,633
Patented Aug. 10, 1971

3,598,633
PROCESS FOR IMPARTING SOIL RELEASE
PROPERTIES TO FIBROUS SUBSTRATES
Joseph T. Rudman, 1051 Bay 25 St.,
Far Rockaway, N.Y. 11691
No Drawing. Continuation-in-part of application Ser. No.
678,708, Oct. 27, 1967. This application Aug. 2, 1968,
Ser. No. 757,182
Int. Cl. B44d 1/16
U.S. Cl. 117—76
14 Claims

ABSTRACT OF THE DISCLOSURE

Substrates, particularly synthetic fabrics, are treated to impart soil release properties thereto.

A urethane elastomer is applied to a substrate and dried. The dried substrtae is then treated with a high molecular weight silicon polymer system and the treated material subsequently cured.

The urethane and silicon systems may be water or organic solvent based.

The systems are applied to a selected substrate by conventional means such as padding, knife over roll coating, etc.

BACKGROUND OF THE INVENTION

This application is a continuation-in-part application of U.S. application, Ser. No. 678,708, filed on Oct. 27, 1967.

This invention relates to a process for treating substrates so as to impart soil release properties thereto. Preferably, the invention is directed to the treatment of fibrous textile substrates.

The advent of synthetic fibers has raised problems which previously were of relatively little concern to the textile industry. Perhaps the most prominent cause for concern was the poor soil release properties which are characteristic of most synthetic fibers, but particularly identified with polyesters per se and polyester blends with natural fibers. Various reasons have been advanced to explain the cause of this poor soil release including the contention that it is due in part to the smoothness of the fiber which acts as a wick for the oils and to the oleophilic nature of the synthetic itself.

A great deal of effort has been spent in attempting to solve this problem of soil release but the previous solutions have generally proved inadequate or have improved soil release at the expense of other desired properties, such as water-resistance, crease-resistance, etc., of the treated material.

U.S. Pat. 3,377,249, to Marco et al., teaches a one step application of acrylic emulsion or acrylic mixtures to render soil release properties to a substrate. The Marco invention is based on the discovery that the emulsion renders the substrate hydrophilic which facilitates water-penetration of the fibers thereby permitting a more effective removal of oily stains.

U.S. Pat. 3,236,685 to Caldwell et al., renders a fabric antistatic and soil-resistant by coating a fabric with a solution or solutions containing a polymeric acid defined as containing —COOH, —$SO_3H$ and/or —$PO_1H_2$ groups. Additionally, a compound containing a polyol or a compound having incorporated therein epoxide groups is included which under proper conditions reacts with the acid to form an ester. U.S. Pat. 3,152,920 also to Caldwell et al., is a complement of the above patent wherein, instead of reacting the polymeric acid with a polyol or an epoxide, the polymeric acid is reacted with the reaction product of a polyol and a polyisocyanate.

It is interesting to note that in each of these methods of the prior art an attempt to impart soil release is made by a one sep application of a particular compound to a textile substrate.

BROAD DESCRIPTION OF THE INVENTION

Accordingly, it is an object of the present invention to impart soil release properties to substrates.

An additional object of the invention concerns a process for imparting soil release properties to textile substrates which will not impair other properties of such substrates.

These and other objects of the present invention are realized in a process which comprises:

applying a dilute system of urethane elastomer to fibrous substrate, said dilute system comprising between about 5 to 30% by weight of said elastomer, based on the weight of said system, in a liquid carrier, so as to effect a 40 to 100% wet pickup of said system, based on the dry weight of said substrate, drying said substrate, treating said dried substrate with a high molecular weight silicone polymer system, said system comprising between about 3 to 20% by weight organo-silicon composition in a liquid carrier so as to effect a 20 to 100% wet pickup of said organosilicon composition system, based on the dry weight of said substrate, and curing said treated substrate.

DETAILED DESCRIPTION OF THE INVENTION

As indicated above, the present invention concerns a two step process for treating substrates, particularly fibrous substrates by first applying a urethane elastomer thereto, drying, treating the dried substrate with a high molecular weight silicone and finally curing the treated substrate.

Any substrate material, both woven and unwoven, may be treated according to this invention. Synthetic textile fabrics including polyesters, polyester/cotton blends and other synthetic fiber/natural fiber blends are included within the scope of the present disclosure.

Any of the conventional urethane elastomers may be used in the invention. As used in the present specification, the term "urethane elastomer" is intended to include all elastomers including urethanes, polyurethanes and modified polurethanes. In a preferred embodiment a polyester-urethane will be employed in the invention. In general, such a composition constitutes a reaction mixture of polyisocyanate-modified polyester and polyols or polyamines.

Illustrative examples of the isocyanate compounds used in forming the polyurethanes used in this invention include:

Polymethylene diisocyanates such as ethylene diisocyanate, trimethylene diisocyanate, tetramethylene diisocyante, hexamethylene diisocyanate, decamethylene diisocyanate, etc., alklene diisocyanates such as butylene-1,3-diisocyanate; alkylidene diisocyanates such as ethylidene diisocyanate; cycloalkylene diisocyanates such as cyclopentylene-1,3,-diisocyanate, cyclohexylene - 1,3 - diisocyanate, cyclohexylene - 1,4 - diisocyanate, etc.; cycloalkylidene diisocyanates such as cyclopentyl diisocyanate, cyclohexylidene diisocyanate, etc.; aromatic diisocyanates such as o-phenylene diisocyanate, 1-methyl - 2,4 - phenylene diisocyante, napthelene -1,4-diisocyante, diphenylene 1,4,4'-diisocyanate, etc.; or aliphaticaromatic diisocyanates such as xylylene-1,4-diisocyanate, xylylene-1,3 diisocyanate, 4,4'-diphenylenemethane diisocyanate, 4'4-diphenylenpropane diisocyanate.

Such compounds are generally reacted with relatively low molecular weight organic polyols or diamines.

Both aliphatic and arylene diamines are used for such a purpose although arylene diamines are preferred. It is to be understood that the term "arylene diamines" means those compounds in which each of the two amino group is attached directly to an aromatic ring. Representative examples of these commonly preferred amines are 4,4'-methylene-bis (2-chloroaniline) 4,4'-methylene-bis (2-carbomethoxy-aniline), 4,4'-diaminodiphenyldisulfide, and 4,4'-diaminodiphenylsulfone. Other useful arylene diamines are: 4,4'-methylene-bis (2-methylaniline), 4,4'-methylene-bis, 2-methoxyaniline), 4,4'-methylene-bis (3-bromoaniline) and 4,4'-methylenedianiline. Mixtures of diamines may be used. Aliphatic diamines which are also used include 1,6-hexamethylenediamine, 1,2-propanediamine, ethylenediamine, cadaverine, putrescine, piperazine, and 2,5-dimethylpiperazine, and 2,5-dimethylpiperazine.

The organic polyols are usually substituted for part or all of the diamine for reaction with a isocyanato-terminated organic liquid composition. The amount of polyol employed should be sufficient to provide about 1 alcoholic hydroxyl group for each free isocyanato group. In other words, a stoichiometric equivalent amount should be used. Representative glycols include, ethylene glycol,
propylene glycol,
trimethylene glycol,
1,2-butylene glycol,
1,3-butanediol,
1,4-butanediol,
1,5-pentanediol,
1,2-hexylene glycol,
1,10-dicanediol,
1,2-cyclohexanediol,
2-butene-1,4-diol,
3-cyclohexene-1,
1-dimethanol,
4-methyl-3-cyclohexene-1,1-dimethanol,
3-methylene-1,5-pentanediol,
   diethylene-glycol,
(2-hydroxyethoxy)-1-propanol,
4-(2-hydroxymethoxy)-1-butanol,
5-(2-hydroxypropoxy)-1-pentanol,
1-(2-hydroxymethoxy)-2-hexanol,
1-(2-hydroxypropoxy)-2-octanol,
3-allyloxy-1,5-pentanediol,
2-alloyloxymethyl-2-methyl-1,3-propanediol,
[(4-pentyloxy) methyl]-1-3-propanediol,
3-(0-propenylphenoxy),
1,2-propanediol,
thiodiglycol,
2,2'-[thiobis (ethyleneoxy)] diethanol,
polyethylene ether glycol (molecular weight 200) and
2,2'-isopropylidenebis (p-phenyleneoxy) diethanol.

In addition, such triols as
glycerol,
1,2,6-hexanetriol,
1,1,1-trimethylolpropane,
3-(2-hydroxyethoxy)-1,2-propanediol,
3-(2-hydroxypropoxy),
1,2-propanediol,
2,4-dimethyl-2-(2-hydroxyethoxy) methylpentanediol-1,5,1,1-tris[(2-hydroxyethoxy) methyl] ethane,
1,1,1-tris[(2-hydroxypropoxy)methyl]propane triethanolamine and triisopropanolamine are also used.

Catalysts are also conventionally employed for the polyurethane reaction such as, for example, vanadyl acetylacetonate, chromium acetylacetonate, beryllium acetylacetonate, cerrous acetylacetonate, zirconium acetylacetonate, aluminum acetylacetonate, and many others.

The polyurethane polymerization reaction can be effectively carried out at any temperature, the only effect of temperature variation being a corresponding change in the rate of reaction. The polymerization can be effected at room temperature, although higher temperatures increase the rate and might be desirable in certain cases; however, the polymerization will take place at temperatures much below room temperature, and thus temperature is not a critical variable.

In the usual case the urethane or polyurethane elastomer will be completely polymerized although a partially polymerized elastomer may be used if desired.

In order to provide a dilute system the elastomer is mixed with a liquid carrier which may be an organic solvent or water. For ease of handling and economic reasons, water is preferred.

When mixed with said liquid carrier the elastomer will preferably be present in an amount between about 5 to 30% of the total mixture.

The dilute system may be applied to the fibrous substrate by any of the conventional means such as, dipping, padding, knife over roll, spraying, kiss roll, smoothing bars, etc. Although, the method described in co-pending application Ser. No. 678,708 is particularly preferred.

The selected means of application may result in the formation of a coating on the substrate, a partial coating and partial impregnation or a total impregnation. Each of these results is considered within the scope of this invention.

Treated substrate will have a wet pickup of between about 40 to 100% by weight based on the dry weight of the substrate.

The substrate containing the applied elastomer is dried at a temperature preferably within the range of 150 to 200° F.

The drying may be effected by any of the conventional means such as infra-red lamps, etc.

Once dried, the substrate is again treated, but in this instance, with a high molecular weight organosilicon composition.

Organosilicon compositions which are operative in this invention include all hydrolyzable silanes, alkali metal salts of organosilanols and siloxanes, having on the average from 1 to 2.5 monovalent hydrocarbon radicals per silicon atom. The silanes which are operative herein include, for example, monomeric silanes such as dimethyldichlorosilane, monomethyltriethoxysilane, ethyldiethoxysilane, octadecyltriacetoxysilane, trimethychlorosilane, vinyldiisopropoxysilane, and phenylmethyldimethoxysilane; polymeric silanes such as methylsilazanes, methylpolysilanes containing Si—Si linkage such as dimethyltetramethoxysilane and silcarbanes such as $Me_2(C_4H_9O)SiCH_2Si (OC_4H_9) Me_2$; siloxanes such as methylhydrogensiloxane, dimethylsiloxane, monomethylsiloxane, octadecylmethylsiloxane, octadecylhydrogensiloxane, phenylhydrogensiloxane and mixtures and copolymers of dimethylsiloxane and methylhydrogensiloxane, ethylhydrogensiloxane, and trimethylsiloxane, and butylhydrogensiloxane and dimethysiloxane; and alkali metals salts or organosilanols such as $MeSi (ONa)_3$, $EtSiO_5$,

and mixtures thereof.

It is to be understood that the organosilicon compositions employed in this invention can be any combination of the above defined "hydrolyzable silanes, siloxanes and alkali metal salts." Thus, for example, the organosilicon compositions which are operative herein include partially hydrolyzed alkoxylated siloxanes and partially hydrolyzed alkoxylate siloxanes which contain Si—Si linkage and Si—C—Si linkage such as those obtained by alkoxylating the distillation residue from the reaction of methylchloride and silicon. The preferred compositions for use in this invention are combinations of methyl-siloxanes and methylhydrogensiloxanes such as those which are particularly described in U.S. Pat. 2,588,365 and silicon polymers marketed under the designation FC-227 by Dow Corning Corporation and X-1033 by Wyandotte Chemical Corporation. Preferred compositions of this type will generally have a high molecular weight in excess of about 800 but usually between about 800 to 200,000.

Generally, such organosilicon composition will be dissolved in an organic solvent solution. However, water may also be utilized as a liquid base to provide aqueous silicon emulsions and latices. Organic solvents commonly used are aliphatics, such as heptane or aromatics such as toluene and xylene.

Conventional catalysts may be added if desired to accelerate the curing of such organo-silicon compositions.

The organosilicon will comprise between about 3 to 20% by weight of the organosilicon composition (liquid system), based on the total weight of said organosilicon composition (liquid system). When treated, the substrate will show between about a 20 to 100% wet pickup of the organosilicon composition (liquid system).

Treatment of the substrate with the organosilicon composition may be effected with any of the known procedures, such as padding, etc., as indicated above.

After the substrate has been treated with the organosilicon compositions it is then heated in any convenient manner at a temperature of at least 250° F.–450° F. or higher. This serves to cure the organosilicon compositions. Preferably, the treated fabric is heated at temperatures of between about 275° F. to 350° F. or higher.

As used in the present specification and claims, the term "cure" refers to the setting and insolubilization of the silanic hydrogen with the substrate surface.

In the absence of indications to the contrary all concentrations and proportions of materials are expressed on a weight basis.

The following examples will further illustrate the invention.

Example 1

Samples of 100% polyester Voile fabric were padded with a 10% solids, completely reacted, modified polyester based polyurethane latex system (Wyandotte Chemical Corp., E-502) to 50% pickup by weight of fabric and dried at a temperature of about 180° F. The dried fabric samples were then padded with a 5% solution of a high molecular weight catalyzed silicone polymer (Dow Corning FC-227) to a 50% pickup and cured at 300° F.

The samples were stained with various soiling substances and subjected to successive washings. After each washing the samples were subjected to a Standard Spray rating test (AATCC–22–1952, ASTM D583–54) and the J. C. Penny Soil Release Test, using weights on the stains. The results were compared to an untreated control sample which had a soil release rating of 1.0 for each of the staining experiments. In the Spray Rating Test, water is sprayed against the surface of a test specimen under controlled conditions producing a wetted pattern whose size depends on the relative repellancy of the fabric. Evaluation is accomplished by comparing the wetted pattern with pictures on a standard chart. A spray Rating of 70 or above is a favorable result.

TABLE 1.—SOIL RELEASE
Water-repellency Spray Test Rating: 80

| Washes | Ratings | | | |
|---|---|---|---|---|
| | Corn oil | Motor oil | Butter | Dirty motor oil |
| 1st wash | 5.0 | 5.0 | 5.0 | 4.0 |
| 2d wash | 5.0 | 5.0 | 5.0 | 5.0 |
| 5th wash | 5.0 | 5.0 | 5.0 | 5.0 |

Example 2

A 65/25 Dacron polyester/cotton fabric was coated with a 20% solids system of the polyurethane latex used in Example 1 to a pickup of ⅛ dry oz. per sq. yd. and dried at a temperature of about 180° F. The fabric was then treated with silicon polymer as in Example 1 and cured at 300° F.

Samples were cut from the fabric and stained with various soiling substances and subjected to successive washings. After each washing the samples were subjected to the J. C. Penney Soil Release Test, using weights on the stains, and compared to an untreated control sample which had a soil release rating of 1.0 for each of the staining experiments. The results are indicated below in Table 2.

TABLE 2.—SOIL RELEASE
Spray Rating: 90

| Washes | Ratings | | | |
|---|---|---|---|---|
| | Corn oil | Motor oil | Butter | Dirty motor oil |
| 1st wash | 5.0 | 4.0 | 5.0 | 3.5 |
| 2d wash | 5.0 | 4.5 | 5.0 | 4.0 |
| 5th wash | 5.0 | 4.5 | 5.0 | 4.0 |

Example 3

The same procedure was followed as in Example 1 except the dried fabric was padded with a 3% solids-water emulsion of an organo-poly-siloxane (Wyandotte Chemicals Corp., X–1033) to a pickup of approximately 1.5% silicon solids based on the dry weight of the fabric. About 0.6% of catalyst (Dow Corning No. 164) was added to the polysiloxane material to act as a crosslinker. The results are indicated below in Table 3.

TABLE 3.—SOIL RELEASE
Spray Rating: 80

| Washes | Ratings | | | |
|---|---|---|---|---|
| | Corn oil | Motor oil | Butter | Dirty motor oil |
| 1st wash | 5 | 5 | 5 | 4.5 |
| 2d wash | 5 | 5 | 5 | 5 |
| 5th wash | 5 | 5 | 5 | 5 |

Example 4

This example shows the results achieved when a fabric is treated according to this invention with a soil release agent as well as a water repellant agent. A Dacron polyester 2-ply warp fabric having a single fill was treated with a modified polyurethane methylethylketone solution such as utilized in Example 1 having a viscosity of 20,000 centipoises. The treated fabric contained ⅛ oz./sq. yd. of the modified polyurethane after drying at 180 degrees F. for one minute. A second impregnation was made of a silicone material sold by the Dow Corning Corporation under its trade name FC-227. The silicone material have a viscosity of 25,000 centipoises. The treated fabric was then cured at a temperature of 300 degrees F. for one minute. The resulting fabric contained 1/16 oz./sq. yd. of the silicone material. The fabric was divided into test specimens and was spotted with various soiling substances such as mustard, oil, ink, etc. In all cases the fabric specimens were machined washed using Tide detergent. The test specimens, then dried and examined for soil retention. In all cases, minimal traces of soil remained.

Fabrics produced according to this invention, in addition to their soil release and water-repellant properties, will also be characterized by soft-hand, wrinkle-resistance, durable-press wash and wear qualities, improved abrasion resistance, resistance to outdoor weathering, excellent flexibility at extreme high and low temperatures, no chlorine retention and non-yellowing of white fabrics.

The principle, preferred embodiments and modes of operation of the present invention have been described in

I claim:
1. A process for imparting soil release properties to fibrous substrate which consists of:
   (a) applying a dilute system of urethane elastomer to a fibrous substrate, said dilute system being comprised of between about 5 to 30 percent by weight of said urethane elastomer and the remainder a liquid carrier, so as to effect a 40 to 100 percent wet pickup of said dilute system based on the dry weight of said fibrous substrate,
   (b) drying said fibrous substrate,
   (c) treating said fibrous substrate on the same surface with a organosilicon composition, said composition comprised of between about 3 to 20 percent by weight organosilicon and the remainder a liquid base, so as to effect a 20 to 100 percent wet pickup of said organosilicon composition based on the dry weight of said fibrous substrate, and
   (d) curing said organosilicon composition on said fibrous substrate.

2. A process according to claim 1 wherein said liquid carrier is selected from the group consisting of organic solvent and water.

3. A process according to claim 1 wherein said liquid base is selected from the group consisting of organic solvent and water.

4. A process according to claim 1 wherein the fibrous substrate is a woven textile fabric.

5. A process according to claim 1 wherein said urethane elastomer is a modified polyester based polyurethane.

6. A process according to claim 1 wherein said fibrous substrate is dried at a temperature between 150° to 200° F.

7. A process according to claim 1 wherein said fibrous substrate is cured at a temperature between 250° to 425° F.

8. A process according to claim 1 wherein said organosilicon is a high molecular weight silicone polymer.

9. A process according to claim 8 wherein said silicone polymer has a molecular weight in excess of about 800.

10. A fibrous material having soil release properties and water-repellency consisting of:
    a fibrous substrate,
    a urethane elastomeric coating on said fibrous substrate, and
    a cured organosilicon composition covering said urethane elastomeric coating.

11. A fibrous material according to claim 10 wherein said urethane elastomer is a modified polyester based polyurethane.

12. A fibrous material according to claim 10 wherein said fibrous substrate is a woven textile fabric.

13. A fibrous material according to claim 10 wherein said cured organosilicon composition is a high molecular weight silicone polymer.

14. A fibrous material according to claim 13 wherein said silicone polymer has a molecular weight in excess of about 800.

References Cited
UNITED STATES PATENTS

| | | | |
|---|---|---|---|
| 3,058,850 | 10/1962 | Sell | 117—76X |
| 3,152,920 | 10/1964 | Caldwell et al. | 117—62.2X |
| 3,190,766 | 6/1965 | Yuan | 117—63 |
| 3,265,529 | 8/1966 | Caldwell et al. | 117—135.5 |
| 3,296,016 | 1/1967 | Murphy | 117—105.5 |
| 3,326,713 | 6/1967 | Smith et al. | 117—76 |
| 3,350,218 | 10/1967 | Gagliardi | 117—76 |
| 3,377,249 | 4/1968 | Marco | 117—161X |
| 3,403,045 | 9/1968 | Erickson et al. | 117—76X |
| 3,481,766 | 12/1969 | Craven et al. | 117—76 |
| 3,481,767 | 12/1969 | Craven et al. | 117—76 |

WILLIAM D. MARTIN, Primary Examiner

M. R. LUSIGNAN, Assistant Examiner

U.S. Cl. X.R.

117—138.8, 143, 161